Sept. 17, 1935.  W. HEFTI  2,014,935

CRANK SHAFT BEARING FOR VERTICAL RECIPROCATING ENGINES

Filed July 27, 1932

INVENTOR
William Hefti
BY
Pennie Davis Marvin Edmonds
ATTORNEY.

Patented Sept. 17, 1935

2,014,935

UNITED STATES PATENT OFFICE 2,014,935

CRANK SHAFT BEARING FOR VERTICAL RECIPROCATING ENGINES

Wilhelm Hefti, Winterthur, Switzerland, assignor to the firm: Sulzer Frères Société Anonyme, Winterthur, Switzerland Application July 27, 1932, Serial No. 624,941
In Switzerland August 27, 1931

5 Claims. (Cl. 308—23)

This invention relates to crankshaft bearings for vertical reciprocating engines such, for example as internal combustion engines of the double-acting type in which each crankshaft bearing is arranged in the bend of a U-shaped supporting member, with a bearing cap adjustably mounted between the arms of the supporting member above the crankshaft.

According to the present invention the bearing cap is secured in position by keys or wedges, one or more of which engage the U-shaped supporting member and the bearing cap on each side of the latter, stiffening members being provided whereby the bearing cap is connected to each arm of the supporting member. The stiffening members thus serve to reduce distortion of the bearing cap due to the action of the securing keys or wedges.

Preferably one or each of the wedges on each side of the bearing cap is furnished with a part which prevents the wedge from turning when in position. If desired distance pieces may be provided for setting the stiffening members between the bearing cap and the two arms of the supporting member above the crankshaft.

Figure 1:
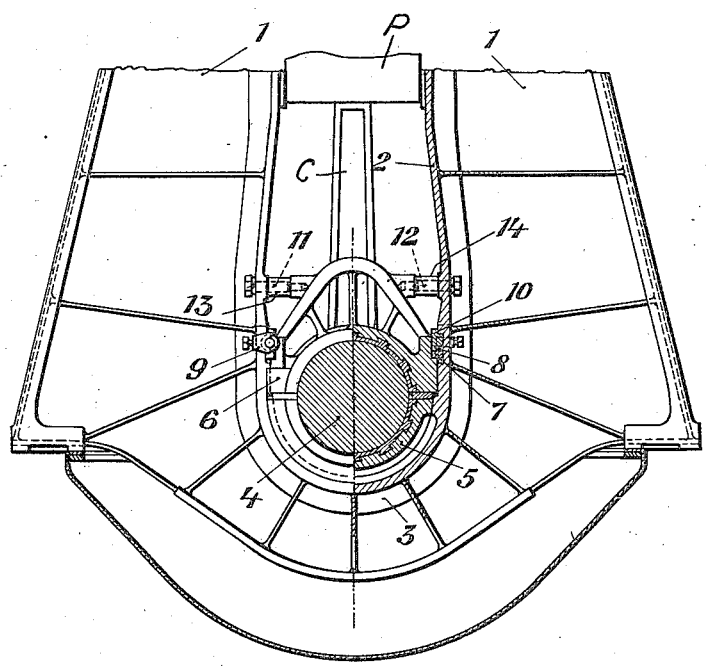
Figure 2:
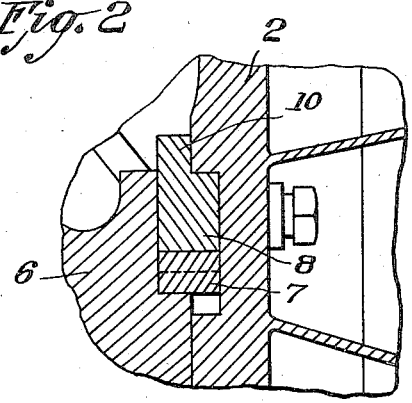

One construction according to the invention is illustrated in the accompanying drawing in which Fig. 1 is a diagrammatic view partly in section through the crankshaft bearing and associated parts, and Fig. 2 is an enlarged sectional view showing the wedges for adjustably retaining the bearing cap in proper position.

In the construction shown the frame 1 of the engine includes a U-shaped supporting member 2 in the bend 3 of which the crankshaft 4 is supported on a bearing brass 5. A connecting rod C connects the piston P with the crankshaft as is usual in internal combustion engines. Arranged between the arms of the U-shaped supporting member 2 above the crankshaft 4 is a bearing cap 6 which is vertically adjustable relatively to the crankshaft and supporting member 2.

The bearing cap 6 is secured in position by means of keys 7 and 8 two of which are provided on each side of the bearing cap as shown and engage recesses in the bearing cap and in the supporting member 2. Thus, by adjusting the wedges 7 and 8 in a direction parallel to the crankshaft 4 the bearing cap 6 will be firmly secured in position whereupon unintentional longitudinal movement of the wedges can be prevented by members 9, one only of which is fully shown in the drawing. Further with a view to preventing turning of the wedges when in position the wedge 8 on each side of the bearing cap is provided with a part of the form of a flange or projection 10 which engages the inner surface of the supporting member 2.

The bearing cap 6 is connected to the two arms of the U-shaped supporting member 2 by means of stiffening members in the form of studs 11 and 12 which are in screwthreaded engagement with an integral portion of the bearing cap, distance pieces 13 and 14 cooperating respectively with the studs 11 and 12. The studs 11 and 12 counteract or compensate for any tendency which the bearing cap 6 may have to become distorted due to the action of the securing wedges 7 and 8, the degree of such compensation being accurately adjusted by means of the distance pieces 13 and 14.

The present invention results not only in a strengthening and lightening of the frame of the engine but also reduces the space occupied thereby.

I claim:

1. A crankshaft bearing construction for internal combustion engines having a piston and a piston rod connected to a crankshaft comprising a U-shaped bearing member for the crankshaft, a removable bearing cap fitting between the arms of the U-shaped bearing member above the crankshaft, means for adjusting the bearing cap in the direction of the movement of the piston including at least one wedge extending longitudinally of the crankshaft and exerting a wedging action on one of the legs of the U-shaped bearing member and the bearing cap, and means connecting the bearing cap and the legs of the U-shaped member for preventing spreading of said legs under wedge action.

2. A crankshaft bearing construction for internal combustion engines having a piston and a piston rod connected to a crankshaft comprising a U-shaped hanger suspended from the upper part of the engine and taking forces from the crankshaft to the cylinder caused by the working of the engine, a removable bearing cap fitted between the legs of the U-shaped hanger above the crankshaft, means for adjusting the bearing cap in the direction of movement of the piston including wedges extending substantially parallel to the direction of the axis of the crankshaft and exerting a wedging action on both the legs of the U-shaped hanger and the bearing cap, and means connecting the bearing cap and the legs of the U-shaped hanger and extending substantially at right angles to the direction of the forces from the crankshaft to the cylinder caused by the working of the engine for preventing spreading of said legs.

3. A crankshaft bearing construction for internal combustion engines having a piston and a piston rod connected to a crankshaft comprising a U-shaped hanger suspended from the upper part of the engine and taking forces from the crankshaft to the cylinder caused by the working of the engine, a removable bearing cap fitted between the legs of the U-shaped hanger above the crankshaft, means for adjusting the bearing cap in the direction of movement of the piston including wedges extending longitudinally of the crankshaft which exert a wedging action on both the legs of the U-shaped hanger and the bearing cap and tend to distort and to spread said legs laterally, means anchored at one end in the bearing cap and at the other end in the legs of the U-shaped hanger for reducing said distortion and coincidentally preventing the spreading of said legs, and means for preventing twisting or turning of said wedges.

4. A crankshaft bearing construction for internal combustion engines having a piston and a piston rod connected to a crankshaft comprising a U-shaped hanger suspended from the upper part of the engine and taking forces from the crank shaft to the cylinder caused by the working of the engine, a removable bearing cap fitted between the legs of the U-shaped hanger above the crankshaft, means for adjusting the bearing cap in the direction of movement of the piston including wedges extending longitudinally of the crankshaft which exert a wedging action on both the legs of the U-shaped hanger and the bearing cap and tend to distort and to spread said legs laterally, means anchored at one end in the bearing cap and at the other end in the legs of the U-shaped hanger for reducing said distortion and coincidentally preventing the spreading of said legs, and flanges on said wedges for preventing twisting or turning of said wedges.

5. A crankshaft bearing construction for internal combustion engines having a piston and a piston rod connected to a crankshaft comprising a U-shaped hanger suspended from the upper part of the engine and taking forces from the crankshaft to the cylinder caused by the working of the engine, a removable bearing cap fitted between the legs of the U-shaped hanger above the crankshaft, means for adjusting the bearing cap in the direction of movement of the piston including wedges which exert a wedging action on both the legs of the U-shaped hanger and the bearing cap and tend to distort the bearing cap inwardly and upwardly and to spread the legs of the U-shaped strap laterally substantially at right angles to the forces in the legs of the U-shaped hanger, studs anchored at one end in the bearing cap and at the other end in the legs of the U-shaped hanger for reducing distortion and coincidentally preventing the spreading of said legs, and distance pieces between the bearing cap and the legs of the U-shaped hanger for setting the studs.

WILHELM HEFTI.